United States Patent
Srouji et al.

(10) Patent No.: US 11,379,503 B2
(45) Date of Patent: Jul. 5, 2022

(54) LOADING RENDERING DATA FOR AN INTERACTIVE COMPUTER SIMULATION

(71) Applicant: CAE Inc., Montreal (CA)

(72) Inventors: Bassem Srouji, Montreal (CA); Stéphane Juteau, Montreal (CA)

(73) Assignee: CAE Inc., Saint-Laurent (CA)

( * ) Notice: Subject to any disclaimer, the term of this patent is extended or adjusted under 35 U.S.C. 154(b) by 0 days.

(21) Appl. No.: 17/065,035

(22) Filed: Oct. 7, 2020

(65) Prior Publication Data

US 2021/0026875 A1 Jan. 28, 2021

Related U.S. Application Data

(63) Continuation of application No. 16/163,626, filed on Oct. 18, 2018, now abandoned.

(51) Int. Cl.
*G06F 16/29* (2019.01)
*G06F 9/451* (2018.01)
*G09B 5/02* (2006.01)
*G06T 17/05* (2011.01)

(52) U.S. Cl.
CPC .............. *G06F 16/29* (2019.01); *G06F 9/451* (2018.02); *G06T 17/05* (2013.01); *G09B 5/02* (2013.01); *G06T 2200/24* (2013.01); *G06T 2210/36* (2013.01)

(58) Field of Classification Search
CPC ................................. G06F 16/29; G06F 9/451
See application file for complete search history.

(56) References Cited

U.S. PATENT DOCUMENTS

| | | | |
|---|---|---|---|
| 8,849,850 B2 | 9/2014 | Baffier et al. | |
| 8,924,921 B2 | 12/2014 | Rush et al. | |
| 9,323,804 B2 | 4/2016 | Weissman | |
| 9,786,027 B1 * | 10/2017 | Cooley | H04L 67/36 |
| 2009/0116732 A1 | 5/2009 | Zhou et al. | |

(Continued)

OTHER PUBLICATIONS

Decentralized Deduplication in SAN Cluster File Systems Source: https://www.usenix.org/legacy/event/usenix09/tech/full_papers/clements/clements_html/ (prior to Oct. 27, 2017).

(Continued)

*Primary Examiner* — Yi Yang
(74) *Attorney, Agent, or Firm* — Matthew Roy; Gowling WLG (Canada) LLP

(57) ABSTRACT

Systems and methods are disclosed for loading rendering data for a scene from a computer generated environment at an interactive computer simulation station. In accordance with one aspect of the present disclosure, a content file is created that defines, for each of a plurality of virtual geographical sectors of a computer generated environment, available levels of detail for the virtual geographical sector and a latest available version that the available levels of detail are contained in. A file associated with an available level of detail in the latest available version is listed in the content file. The content file is loaded into memory during execution of an interactive computer simulation station for real-time access by the interactive computer simulation station to determine which files are available to be loaded for rending of the scene having a target level of detail in a latest available version.

19 Claims, 6 Drawing Sheets

(56) References Cited

U.S. PATENT DOCUMENTS

| | | | |
|---|---|---|---|
| 2009/0144642 A1* | 6/2009 | Crystal .............. | G06F 3/04817 715/764 |
| 2010/0246939 A1 | 9/2010 | Aisaka et al. | |
| 2013/0325903 A1 | 12/2013 | Rohlf et al. | |
| 2015/0161760 A1 | 6/2015 | Nordstoga | |

OTHER PUBLICATIONS

GCF/Steam Source: https://developer.valvesoftware.com/wiki/GCF (prior to Oct. 27, 2017).

International Search Report of corresponding PCT/CA2019/051476 dated Oct. 18, 2019.

* cited by examiner

LOADING RENDERING DATA FOR AN INTERACTIVE COMPUTER SIMULATION

RELATED APPLICATION

This non-provisional patent application is a continuation of the U.S. patent application Ser. No. 16/163,626, filed on Oct. 18, 2018, entitled "LOADING RENDERING DATA FOR AN INTERACTIVE COMPUTER SIMULATION" in the name of CAE Inc., of which being incorporated by reference in its entirety.

TECHNICAL FIELD

The present disclosure relates to loading rendering data for a scene from a computer generated environment at an interactive computer simulation station, and in particular to loading the rendering data from a computer generated environment database during the interactive computer simulation in real-time.

BACKGROUND

In interactive computer simulations, the behavior of an object is simulated in accordance with a simulation model that is tailored for the type of object being simulated. The simulation models are used by a simulation computing device to simulate the behavior of a given object based on commands received by a user or trainee at the interactive computer simulation station using instrumentation. The object is simulated at the interactive computer simulation station within a scene of a computer generated environment. For the scene of the computer generated environment to be presented to the user at the simulation station, rendering data for that scene must be loaded in real-time as the object being simulated is controlled by the user and moves through the computer generated environment.

The rendering data is loaded from a database that stores files representing the computer generated environment. As the size and complexity of the computer generated environment increases, the database must store a very large number of small files. Storage and access of the large number of files to render different scenes of the computer generated environment in real-time during a simulation is challenging, and the large number of files prevents and/or restricts manipulation of the files, which significantly reduces development, update, and configuration of the files representing the computer generated environment.

The present invention helps to address this shortcoming.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present invention is directed to a method for loading rendering data for a scene from a computer generated environment at an interactive computer simulation station. The method comprises defining a computer generated environment database, on disk, in a plurality of versions. The computer generated environment database comprises a plurality of virtual geographical sectors and each of the virtual geographical sector is defined by 1 to f distinct files stored on the disk in the computer generated environment database, the 1 to f files being associated with distinct levels of detail for the virtual geographical sector. The method also comprises defining, in one or more content files, available levels of detail and a latest version that the available levels of detail are contained in for each of the plurality of virtual geographical sectors by listing a corresponding one of the distinct files stored on disk. The method also comprises, during execution of an interactive computer simulation at the interactive computer simulation station, loading the one or more content files into memory for real-time access and, still during execution of the interactive computer simulation at the interactive computer simulation station, identifying a subset of s sectors from the plurality of virtual geographical sectors relevant to the scene each having a target level of detail, with $s \geq 1$. For each sector $s_i$ of the s sectors, the method continues with accessing the one or more content files in the memory, for, in real-time, determining a latest available version for the sector $s_i$ having the target level of detail and, still for each sector $s_i$ of the s sectors, for the sector $s_i$, loading the file in the target level of detail from the latest available version from the disk storing the computer generated environment database.

In some embodiments, the interactive computer simulation station comprises an instrument module that is configured to receive commands from a user related to the interactive computer simulation, and wherein the rendering data for the scene is loaded in real-time based on the commands.

Optionally, the method may, additionally or alternatively, comprise rendering the scene at the interactive computer simulation station using a Graphical User Interface (GUI) module, wherein rendering the scene comprises rendering the file in the target level of detail from the latest available version loaded for each sector $s_i$ of the s sectors relevant to the scene.

Optionally, the plurality of virtual geographical sectors defined in the computer generated environment database may alternatively or additionally be associated with a subset of the computer generated environment. The one or more content files may optionally be defined by the interactive computer simulation station and loaded into the memory upon execution of the interactive computer simulation at the interactive computer simulation station. Alternatively, the one or more content files may optionally be continuously defined by the interactive computer simulation station and loaded into the memory during execution of the interactive computer simulation. The target level of detail may be a highest level of detail available for the respective virtual geographical sector. In an alternative, the target level of detail for respective virtual geographical sectors may be predefined based on the interactive computer simulation. In another alternative, the target level of detail for respective virtual geographical sectors may dynamically change based on relevance to the scene.

Optionally, when there is no available version for the sector having the target level of detail, a determination may be made of a latest available version for the sector having a level of detail less than the target level of detail, in descending order of the level of detail.

A second aspect of the present invention is directed to a system for loading rendering data for a scene from a computer generated environment at an interactive computer simulation station. The system comprises a storage system and the interactive computer simulation station. The storage system comprises a computer generated environment database stored on a disk, in a plurality of versions. The computer generated environment database comprises a plurality of virtual geographical sectors and each of the virtual geographical sectors is defined by 1 to f distinct files stored on the disk in the computer generated environment database, the 1 to f files being associated with distinct levels of detail for the virtual geographical sector. The storage system also comprises one or more content files comprising available levels of detail and a latest version that the available levels of detail are contained in for each of the plurality of virtual geographical sectors by listing a corresponding one of the distinct files stored on disk. The interactive computer simulation station is operably coupled with the computer storage system. The interactive computer simulation station comprises a processor and a memory for storing computer-executable instructions that when executed by the processor configure the processor during execution of an interactive computer simulation to load the one or more content files into the memory for real-time access and to identify a subset of s sectors from the plurality of virtual geographical sectors relevant to the scene each having a target level of detail, with s≥1. The computer-executable instructions, when executed by the processor, also configure the processor during execution of an interactive computer simulation to, for each sector $s_i$ of the s sectors, access the one or more content files in the memory, for, in real-time, determining a latest available version for the sector $s_i$ having the target level of detail and, for the sector $s_i$, load the file in the target level of detail from the latest available version from the disk storing the computer generated environment database.

In some embodiments, the interactive computer simulation station may further comprise an instrument module that is configured to receive commands from a user related to the interactive computer simulation, and wherein the rendering data for the scene is loaded in real-time based on the commands. The interactive computer simulation station may optionally further comprise a Graphical User Interface (GUI) module configured to render the scene at the interactive computer simulation station by rendering the file in the target level of detail from the latest available version loaded for each sector $s_i$ of the s sectors relevant to the scene. Optionally, the interactive computer simulation station may further comprise, additionally or alternatively, a network interface module configured to receive the 1 to f files defining each of the plurality of virtual geographical sectors over a communications network. The plurality of virtual geographical sectors defined in the computer generated environment database may be associated with a subset of the computer generated environment.

Optionally, the one or more content files may be defined, additionally or alternatively, by the interactive computer simulation station and loaded into the memory upon execution of the interactive computer simulation station. Optionally, The one or more content files mays alternatively be continuously defined by the interactive computer simulation station and loaded into the memory during execution of the interactive computer simulation.

A third aspect of the present invention is directed to an interactive computer simulation station, for loading rendering data for a scene from a computer generated environment, comprising a storage system, a processor and a memory. The storage system comprises a computer generated environment database stored on a disk, in a plurality of versions. The computer generated environment database comprises a plurality of virtual geographical sectors and each of the virtual geographical sectors being defined by 1 to f distinct files stored on the disk in the computer generated environment database, the 1 to f files being associated with distinct levels of detail for the virtual geographical sector. The storage system also comprises one or more content files comprising available levels of detail and a latest version that the available levels of detail are contained in for each of the plurality of virtual geographical sectors by listing a corresponding one of the distinct files stored on disk.

The processor and the memory are for storing computer-executable instructions that, when executed by the processor, configure the processor during execution of an interactive computer simulation to load the one or more content files into the memory for real-time access, identify a subset of s sectors from the plurality of virtual geographical sectors relevant to the scene each having a target level of detail, with s≥1 and, for each sector $s_i$ of the s sectors, access the one or more content files in the memory, for, in real-time, determining a latest available version for the sector $s_i$ having the target level of detail and, for the sector $s_i$, load the file in the target level of detail from the latest available version from the disk storing the computer generated environment database.

The interactive computer simulation station may optionally further comprise an instrument module that is configured to receive commands from a user related to the interactive computer simulation, and the rendering data for the scene may be loaded in real-time based on the commands. The interactive computer simulation station may further alternatively or additionally comprise a Graphical User Interface (GUI) module configured to render the scene at the interactive computer simulation station by rendering the file in the target level of detail from the latest available version loaded for each sector $s_i$ of the s sectors relevant to the scene. The interactive computer simulation station may yet further comprise, additionally or alternatively, a network interface module configured to receive the 1 to f files defining each of the plurality of virtual geographical sectors over a communications network, and the plurality of virtual geographical sectors defined in the computer generated environment database may be associated with a subset of the computer generated environment.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
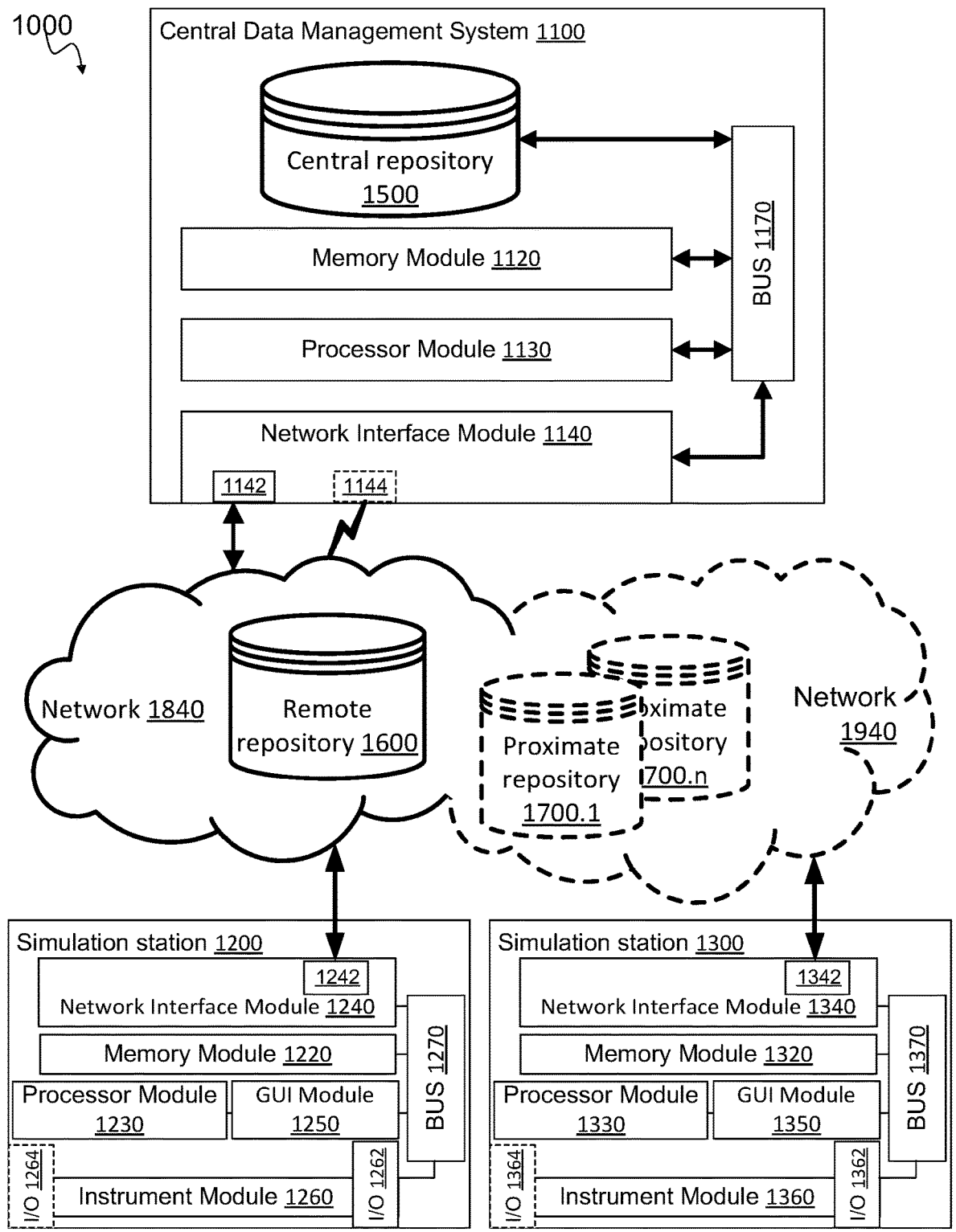
FIG. 1 shows a representation of a first logical representation of an exemplary system for loading rendering data for a scene from a computer generated environment at an interactive computer simulation station in accordance with the teachings of the present invention.

The present disclosure describes systems and methods for loading rendering data for a scene from a computer generated environment at an interactive computer simulation station. The computer generated environment, or a portion thereof, is defined within a computer generated environment database, which is stored on disk. A simulation station that is used for training a user to control a simulated object can access the computed generated environment database to load rendering data in real-time for a scene of the computer generated environment to be rendered and displayed to the user at the simulation station.

The interactive computer simulation station comprises an instrument module that allows the user to input commands for control of the object being simulated. As the simulated object is controlled and moves within the computer generated environment, the simulation station loads the rendering data for the scene of the computer generated environment by accessing/querying the computer generated environment database. For example, the simulation station may request to access a specific file comprising the rendering data for the scene to be rendered in the simulation. The specific file is typically a unique file within the computer generated environment database that typically has an associated level of detail (LOD) within a version of the computer generated environment. Some of the files may not have associated LOD information associated therewith even though most of them do. Likewise, most files are associated with a geographical sector but some files are not geographically tagged (i.e., are global files).

Conventionally, the file is searched for within the computer generated environment database by scanning through all files in descending order of versions. However, when a large number of versions exists, looking for the specified file by scanning through all files in descending order of versions affects the system performance. As can be appreciated, the system performance becomes dependent upon the number of versions. If the specific file exists within the computer generated environment database, the simulation stations may encounter latency caused by reading operation over a network of the numerous small files. If the specific file being requested does not exist within the computer generated environment database, every version within the database must be checked before concluding that the file does not exist. Moreover, the computer generated environment database cannot be stored in memory of the simulation stations because it would simply require too much storage space.

Accordingly, additional, alternative, and/or improved systems and methods for loading rendering data for a scene from a computer generated environment at an interactive computer simulation station are desired.

In accordance with one aspect of the present disclosure, a content file (or index file) is created that defines, for each of a plurality of virtual geographical sectors of a computer generated environment, available levels of detail for the virtual geographical sector and a latest available version that the available levels of detail are contained in. The content file defines metadata describing the content of all available versions present in the file system. For each version, the metadata could include a plurality of virtual geographical sectors and/or the available level of details and/or the list of the files included in the version and/or other type of metadata. As such, the files present in the file system are listed in the content file with an identifier of the version to which they relate. An associated available level of detail in the latest available version may also be listed in the content file. The content file is loaded into memory during execution of an interactive computer simulation station for real-time access.

During the execution of the interactive computer simulation a subset of virtual geographical sectors are identified as being relevant to a scene to be displayed to a user at the simulation station. Each of the identified virtual geographical sectors may have a target level of detail that is specified for rendering the scene. By accessing the content file loaded in the memory in real-time during the simulation, a latest available version of the computer generated environment having the target level of detail for each of the virtual geographical sectors can be quickly determined. The file in the target level of detail from the latest available version can thus be accessed from the computer generated environment database.

In accordance with the above aspect of the present disclosure, the content file can be stored in the memory of the interactive computer simulation station because it simply contains a listing of files and associated metadata as opposed to storing the files themselves, and therefore does not require large amounts of storage space. Furthermore, by accessing the content file the determination of what files to be loaded is made quickly and the corresponding files are loaded. Without the content file, the interactive computer simulation station would have to make repeated calls over a network to the computer generated environment to determine what files are available to be loaded and then to load the appropriate files, resulting in network latency and requiring a long time to load the files, particularly if a requested file does not exist in the computer generated environment database.

In another aspect of the present disclosure relates to a disk driver layer to provide a virtual directory that is the union of the multiple physical directories. The union resolve overlapping files that might exist in multiple physical directory by taking in consideration the directory listing order. For instance, three different physical directories might have some overlapping file name with different file content (e.g., from different versions and/or different levels of detail). A virtual directory is defined based on a specific list of physical or other virtual directories. The specific list also provides the order of precedence to resolve conflicts should a file exist in more than one source directories (e.g., any given file is presented only once considering a priority indicator for the relevant physical directories). The disk driver may also optimise file lookup between multiple versions by leveraging the underlying file system infrastructure such as the Master File Table on the NTFS system.

The computer generated environment database disclosed herein may, for example, be defined and used in accordance with various standard file systems. As one non-limiting example, the computer generated environment database may comply with common standard formats for storing and accessing geospatial data and which is used for modeling and simulation.

Embodiments are further described below, by way of example only, with reference to FIGS. 1-6.

FIG. 1 shows a representation of a first logical representation of an exemplary system for loading rendering data for a scene from a computer generated environment at an interactive computer simulation station in accordance with the teachings of the present invention. The system for loading rendering data for a scene from a computer generated environment at an interactive computer simulation station is represented in FIG. 1 as interactive computer simulation system 1000. The interactive computer simulation system 1000 performs one or more interactive computer simulations. Each interactive computer simulation comprises one or more simulated objects/systems such as simulated vehicles (simulated aircrafts, simulated tanks or ground vehicles, simulated marine vessel, etc.).

The interactive computer simulation system 1000 comprises a central data management system 1100 and one or more interactive computer simulation stations (e.g. a first interactive computer simulation station 1200 and a second interactive computer simulation station 1300). The simulation stations 1200 and 1300 and the central data management system 1100 are configured to exchange data over network 1840, which may be connected to and/or provide access to a secondary network 1940. The exemplary interactive computer simulation system 1000 further comprises a data storage system. In the depicted example shown in FIG. 1, the data storage system is a distributed data storage system that includes a central repository 1500 located at the central data management system 1100, a remote repository 1600 disposed in network 1840, and possibly one or more proximate repositories 1700.1-1700.n disposed in the secondary network 1940. A distributed data storage system is only one implementation of the present disclosure, and a person skilled in the art would readily appreciate that the data storage system does not necessarily have to be distributed.

The simulation stations 1200 and 1300 are respectively configured to train a user to control a simulated object associated with the simulation station. As depicted in FIG. 1, each of the simulation stations 1200, 1300 comprise a memory module 1220, 1320, a processor module 1230, 1330, a network interface module 1240, 1340 comprising one or more ports (represented as a singular port 1242 and 1342), a GUI module 1250, 1350, and an instrument module 1260, 1360 comprising one or more input/output interfaces (represented as internal I/O interfaces 1262, 1362, and external I/O interfaces 1264, 1364). The components of the simulation stations, including the memory module 1220, 1320, processor module 1230, 1330, network interface module 1240, 1340, GUI module 1250, 1350, and instrumentation module 1260, 1360 (through internal I/O interface 1262, 1362) may be electrically connected via bus 1270, 1370, however the present disclosure is not affected by the way the different modules exchange information between them. For instance, some modules could be connected by a parallel bus, but could also be connected by a serial connection or involve an intermediate module without affecting the teachings of the present invention.

The memory module 1220, 1320 may comprise various types of memory (different standardized or kinds of Random Access Memory (RAM) modules, memory cards, Read-Only Memory (ROM) modules, programmable ROM, etc.). The processor module 1230, 1330 may represent a single processor with one or more processor cores or an array of processors, each comprising one or more processor cores. The GUI module 1250, 1350 may comprise display screens that could be split into one or more flat panels, but could also be a single flat or curved screen visible from an expected user position (not shown) in the simulation stations. For instance, the GUI module 1250, 1350 may comprise one or more mounted projectors for projecting images on a curved refracting screen. The curved refracting screen may be located far enough from the user of the interactive computer program to provide a collimated display. Alternatively, the curved refracting screen may provide a non-collimated display. The simulation stations 1200, 1300 may also comprise one or more seats (not shown) or other ergonomically designed tools (not shown) to assist the user of the interactive computer simulation in getting into proper position to gain access to some or all of the instrument module 1260, 1360. The simulation stations 1200 and 1300 may contain various additional components (not shown in FIG. 1), such as a memory module, storage, dedicated graphics unit, etc., as would be readily appreciated by a person skilled in the art.

The simulation stations 1200 and 1300 may load rendering data for a scene from a computer generated environment from a computer generated environment database, which may, for example, be contained in the remote repository 1600 and/or the proximate repository(ies) 1700.1-n, as further described herein. The interactive computer simulation stations 1200 and 1300 may access the remote repository and/or the proximate repository(ies) 1700.1-n via the network 1840 and/or 1940 through the port 1242, 1342 of the network interface module 1240, 1340.

For example, the user of the simulation station 1200, 1300 may input control commands to the instrument module 1260, 1360 for manipulating/controlling a simulated object associated with the simulation station 1200, 1300. As the simulated object is manipulated in the simulation, rendering data for the scene being displayed to the user is loaded. The actual stacks of protocols used by the physical network interface(s) and/or logical network interface(s) represented by ports 1242, 1342 of the network interface module 1240, 1340 and I/O modules 1262, 1264, 1362, 1364 of the instrument module 1260, 1360 do not affect the teachings of the present invention.

Depending on the type of simulation (e.g., level of immersivity), the tangible instruments may be more or less realistic compared to those that would be available for controlling an actual object. For instance, the tangible instruments provided by the instrument modules 1260, 1360 may replicate an actual object control system where actual instruments found in the controller or physical interfaces having similar physical characteristics are provided to the user (or trainee). As previously described, the actions that the user or trainee takes with one or more of the tangible instruments provided via the instrument modules 1260, 1360 (e.g., modifying lever positions, activating/deactivating switches, etc.) allow the user or trainee to control the simulated object in the interactive computer simulation. In the context of an immersive simulation being performed in the interactive computer simulation system 1000, the instrument module 1260, 1360 would typically support a replicate of an actual instrument panel found in the actual system being the subject of the immersive simulation. While the present disclosure is applicable to immersive simulations (e.g., flight simulators certified for commercial pilot training and/or military pilot training, etc.), skilled persons will readily recognize and be able to apply its teachings to other types of interactive computer simulations.

The instrument module 1260, 1360 may yet also comprise a mechanical instrument actuator (not shown) providing one or more mechanical assemblies for physically moving one or more of the tangible instruments of the instrument module 1260, 1360 (e.g., electric motors, mechanical dampeners, gears, levers, etc.). The mechanical instrument actuator may receive one or more sets of instructions (e.g., from the processor module 1230, 1330) for causing one or more of the instruments to move in accordance with a defined input function. The mechanical instrument actuator of the instrument module 1260, 1360 may also alternatively or in addition be used for providing feedback to the user of the interactive computer simulation through tangible and/or simulated instrument(s) (e.g., touch screens, or replicated elements of an aircraft cockpit or of an operating room). Additional feedback devices may be provided with the simulation stations 1200, 1300 or in the interactive computer simulation system 1000 (e.g., vibration of an instrument, physical movement of a seat of the user and/or physical movement of the whole system, etc.).

The external I/O module 1264, 1364 of the instrument module 1260, 1360 may connect one or more external tangible instruments (not shown) therethrough. The external I/O module 1264, 1364 may be required, for instance, for interfacing the interactive computer simulation system 1000 with one or more tangible instruments identical to an Original Equipment Manufacturer (OEM) part that cannot be integrated into the simulation stations 1200, 1300 (e.g., a tangible instrument exactly as the one that would be found in the actual system subject of the interactive simulation). The internal I/O module 1262, 1362 may comprise necessary interface(s) to exchange data, set data or get data from integrated tangible instruments. The internal I/O module 1262, 1362 may be required, for instance, for interfacing the interactive computer simulation system 1000 with one or more integrated tangible instrument identical to an Original Equipment Manufacturer (OEM) part (e.g., a tangible instrument exactly as the one that would be found in the actual system subject of the interactive simulation).

The network 1840 may be connected or may provide access to a network 1940. Skilled persons will readily understand that the direct connections or a mix of direct and network connections may be used to interconnect the central data management system 1100 and the simulation stations 1200 and 1300. Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on links. Likewise, any number of routers and/or switches (not shown) may be present on links, which may further transit through the Internet.

In the depicted example of FIG. 1, the central data management system 1100 comprises a memory module 1120, a processor module 1130 and a network interface module 1140, which may be similar to the memory module 1220, 1320, the processor module 1230, 1330, and network interface module 1240, 1340 of the simulation stations 1200, 1300. The network interface module 1140 represents at least one physical interface (two interfaces, 1142 and 1144 are depicted in FIG. 1) that can be used to communicate with other network nodes. The network interface module 1140 may be made visible to the other modules of the computer system 1100 through one or more logical interfaces. The variants of processor module 1130, memory module 1120 and network interface module 1140 usable in the context of the present invention will be readily apparent to persons skilled in the art. A bus 1170 is depicted as an example of means for exchanging data between the different modules of the central data management system 1100.

A data storage system is also provided in the interactive computer simulation system 1000. In the example of FIG. 1, a distributed data storage system is depicted wherein the central data management system 1100 comprises a central repository 1500 of the data storage system for storing a synthetic natural environment database that comprises data for representing a plurality of geographically-located polygon meshes of the computer generated environment. More particularly, the central repository 1500 may store all files of all levels of details for all versions of a complete computer generated environment. The central repository 1500 may also log dynamic data in relation to the different simulated systems while the interactive computer simulation is performed.

The data storage system depicted in FIG. 1 also comprises a remote repository 1600 for storing a subset of the synthetic natural environment database. More particularly, the remote repository may store a subset of files associated with the computer generated environment. The remote repository 1600 is accessible by the central data management system 1100 via the network 1840 through the network interface module 1140. The remote repository 1600 is also accessible to the simulation stations 1200, 1300 via the network 1840 through port 1242, 1342.

In some embodiments, each of the simulation stations 1200, 1300 are further connected to a proximate repository 1700.1-*n* (referred to collectively as the proximate repositories 1700). The proximate repositories 1700 may thus each serve a small number of the simulation stations 1200, 1300. In some embodiments each of the proximate repositories is dedicated to a single of the simulation stations. The distributed data storage system may thus support a hierarchical configuration when the proximate repositories are provided. The proximate repositories 1700 are accessible by the remote repository 1600 through the network 1940. The proximate repositories 1700 are also accessible to the simulation stations 1200, 1300 through the network 1940. In embodiments where proximate repositories are provided, each of the proximate repositories 1700 store their own proximate subset of the synthetic natural environment database that are each fully encompassed in the subset stored at the remote repository 1600.

FIG. 1 shows the central repository 1500 as a database integrated with the central data management system 1100 while the remote repository 1600 and the optional proximate repositories 1700 are depicted as standalone databases. Skilled persons will acknowledge that different data storage configurations may be provided (standalone database system, a distinct module of a system or a sub-module of a memory module). The data storage system does not necessarily comprise repositories implemented using a single configuration or, conversely, mutual exclusive configurations. The distributed data storage system may comprise one or more logical or physical as well as local or remote hard disk drive (HDD) (or an array thereof). The data storage system may further comprise a local or remote database made accessible to the central data management system 1100 and/or the simulation stations 1200, 1300 by a standardized or proprietary interface or via the network 1840/1940. The configuration variants of distributed data storage system usable in the context of the present invention will be readily apparent to persons skilled in the art.

Figure 2:
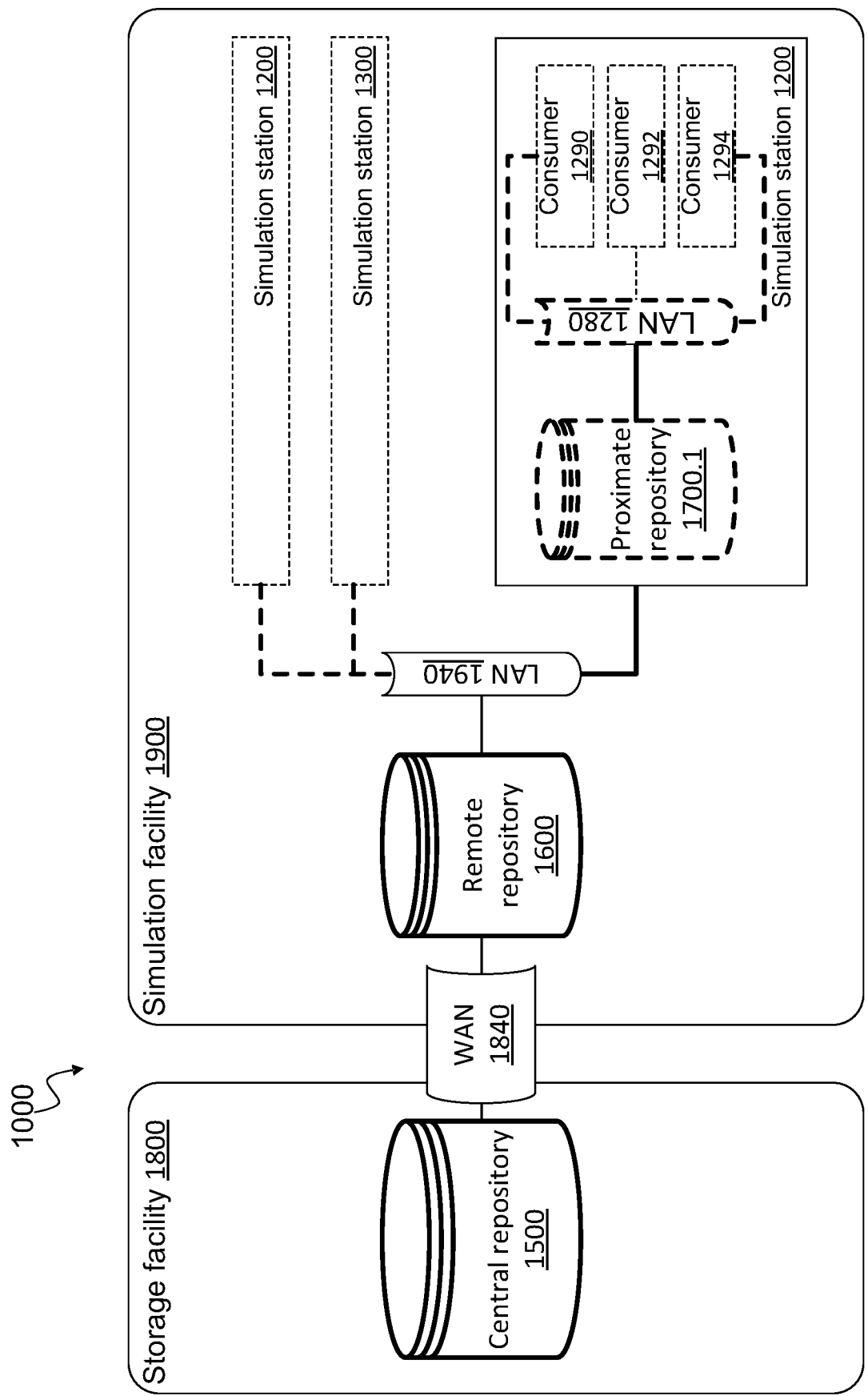
FIG. 2 shows a representation of a second logical representation of the exemplary system for loading rendering data for a scene from a computer generated environment at an interactive computer simulation station in accordance with the teachings of the present invention.

FIG. 2 shows a representation of a second logical representation of the exemplary system for loading rendering data for a scene from a computer generated environment at an interactive computer simulation station in accordance with the teachings of the present invention.

The interactive computer simulation system 1000 depicted in FIG. 2 shows the central repository 1500 of the data storage system depicted as being located at a storage facility 1800. The remote repository 1600 and the simulation stations 1200, 1300 are depicted as being co-located in a simulation facility 1900. The network 1840 is depicted as a Wide Access Network (WAN), which typically connect remote sites. The network 1940 is depicted as a Local Access Network (LAN), which typically connect systems at a single site. In comparison to the example of FIG. 1, the example of FIG. 2 shows the proximate repositories 1700 as being integrated in their respective simulation stations 1200 and 1300. In the example of FIG. 2, the first simulation station 1200 also comprises an internal network (LAN 1280) interconnecting different simulation data consumers 1290, 1292, 1294 thereof towards the proximate repository 1700.1.

Skilled persons will readily recognize that an actual interactive computer simulation system 1000 likely comprises many simulation stations 1200, 1300 distributed over multiple simulation facilities (only 1900 shown in FIG. 2). In the depicted example, the central repository 1500 contains all the synthetic natural environment database for the interactive computer simulation system 1000. The remote repository 1600 contains a subset of data stored at the central repository 1500 and each of the proximate repositories 1700 store a proximate subset of the data stored at the remote repository 1600. The synthetic natural environment database could be distributed over different repositories (not shown) in a manner transparent to the remote repository 1600 (i.e., single network address for the central repository 1500, distributed or not). Likewise, the subset stored at the remote repository 1600 could be distributed over different repositories (not shown) in a manner transparent to the proximate repositories 1700 or the simulation stations 1200 (i.e., single network address for the remote repository 1600, distributed or not). Similarly, when proximate repositories 1700 are provided, the proximate subsets stored at the proximate repositories 1700 may yet also be distributed over different repositories (not shown) in a manner transparent to the simulation stations 1200, 1300 (i.e., single network address for each of the proximate repositories 1700, distributed or not). The management functionalities of the central data management system 1100 and/or remote repository 1600 may also be distributed over different network nodes or provided by a distributed virtual computer system or cloud system.

As such, the central repository 1500 comprises the synthetic natural environment database that comprises data for representing a plurality of geographically-located datasets of the computer generated environment of the interactive computer simulation (e.g., polygon meshes, elevation map, imagery, point features, 3D models and a plurality of global non-geographically-located datasets such as generic 3D models and metadata). During the interactive computer simulation, the simulated object moves within the computer generated environment considering, among other things, commands received from user through the tangible instrument module 1260, 1360. In order to display relevant images of the computer generated environment at the present location of the simulated vehicle, the simulation station 1200, 1300 requires the relevant data from the synthetic natural environment database (e.g., the geographically-located polygon meshes). As the complete synthetic natural environment database is too large to be stored and managed locally at the simulation station 1200, 1300, the simulation station 1200, 1300 loads relevant data when needed.

Figure 3:
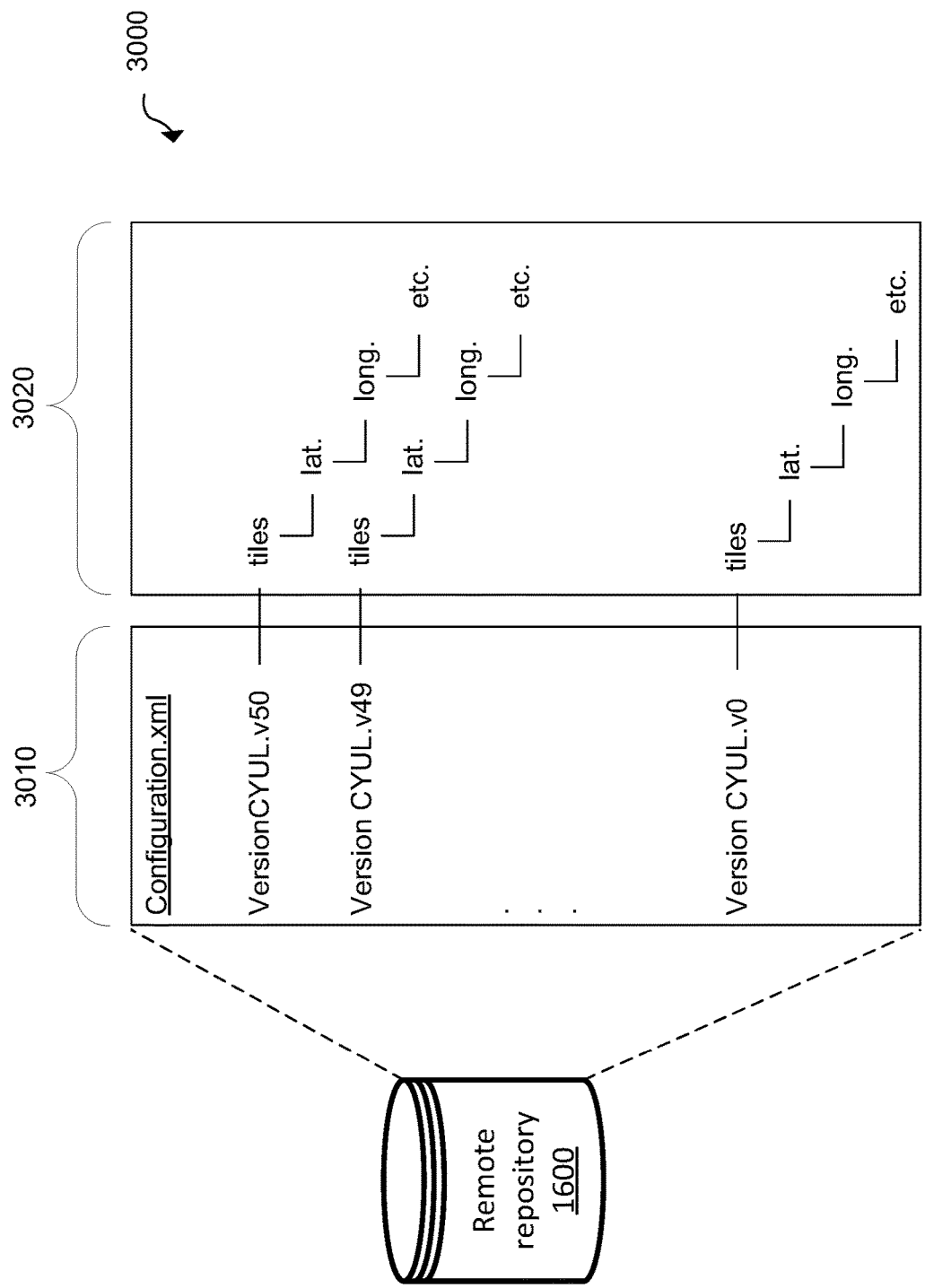
FIG. 3 shows a representation of a file structure in a computer generated environment database.

FIG. 3 shows a representation of a file structure in a computer generated environment database. Specifically, FIG. 3 shows a representation of a configuration file 3000 named 'Configuration.xml' defined within a computer generated environment database. The configuration file 3000 lists a plurality of versions 3010 of the computer generated environment. The configuration file 3000 further refers to, or comprises, a listing of a plurality of files 3020 for each of the listed versions. As skilled persons will readily understand, the actual files from the plurality of versions are stored in the file system and not in the configuration file 3000. The files stored in the file system represent different datasets of the computer generated environment, such as "tiles", "latitude", "longitude", etc. More particularly, each version may comprise a plurality of virtual geographical sectors, as will be further described herein, and each of the virtual geographical sectors are defined by 1 to f distinct files that are associated with distinct levels of detail for the virtual geographical sector (this association is not depicted in FIG. 3). Said differently, one version contains files structured in a directory structure where each directory layer represent some metadata information such as dataset, latitude, longitude, level of details, etc.

In most configurations, the configuration file 3000 refers to or comprises a subset of the listing of the plurality of files 3020 for a computer generated environment that would be included in the central repository 1500. The configuration file 3000 is depicted in FIG. 3 as being stored on disk within remote repository 1600, however it is also noted that the configuration file 3000 may be stored on disk in proximate repository 1700. Moreover, as described with reference to FIG. 1 the data storage system may not be that which is exemplarily depicted in FIG. 1, and the configuration file 3000 may be stored within a computer generated environment database on disk in a different repository.

In one example, the computer generated environment stored at the central repository 1500 may comprise all files of all levels of detail for all versions of a computer generated environment that is a virtual representation of Earth. That is, the files stored in the central repository 1500 may comprise rendering data for every point (i.e. latitude and longitude) on Earth, and moreover there may be several files having distinct levels of details for the same points on Earth. A simulation station, for example the first simulation station 1200, may purchase/license/have access to a subset of the files for the computer generated environment. The subset of files may be sent from the central repository 1500 to a remote repository 1600 or a proximate repository 1700 for loading during execution of an interactive computer simulation at the interactive computer simulation station. As depicted in FIG. 3, the configuration file 3000 stored on disk in the remote repository 1600 comprises 50 versions of the computer generated environment for Montreal's Pierre-Elliott Trudeau airport (which has airport code 'YUL').

Each of the 50 versions 3010 comprise a plurality of files 3020. Each file of the plurality of files 3020 is unique and can be loaded by the simulation station for rendering. Though not depicted in FIG. 3, subsets of the plurality of files for each version may comprise virtual geographical sectors of the computer generated environment (e.g. one virtual geographical sector may be landscape, another geographical sector may be surrounding buildings, etc.), and each of the files may have associated therewith distinct levels of detail for the virtual geographical sector (e.g. some files may represent a level of detail 10 being most detailed, other files may represent a level of detail 1 being least detailed). The level of detail and/or number of files of the plurality of files 3020 may also be dependent on what an operator of a simulation station has purchased/licensed.

When a simulation station requests to load a specific file of a target level of detail for rendering a scene, the specific file is searched for in decreasing version number. If the specific file has not been returned, then the target level of detail may be decreased and a corresponding file of the lower level of detail is again searched for in decreasing version number. Such a method for loading the requested file can result in network latency and difficulty with rendering scenes in the simulation. Further, if the requested file does not exist in the computer generated environment database, the system takes a long time to determine that the file does not exist. For example, standards may indicate that only a maximum number of versions (e.g., 8 versions) of the computer generated environment are to be used at one time.

In another example file structure, the computer generated environment database may be defined to fold all of the files 3020 for all versions 3010 into a single group of files. This may help to provide a faster search to determine if a specified file exists or not. However, creating a folded file structure in this manner loses version/priority information associated with the files. For example, if a given version of Montreal's Pierre-Elliott Trudeau airport needs to be replaced, the deployment of the new airport will overwrite existing files but will fail to remove previous one that are not used anymore because files associated with the previous airport cannot be identified.

Figure 4:
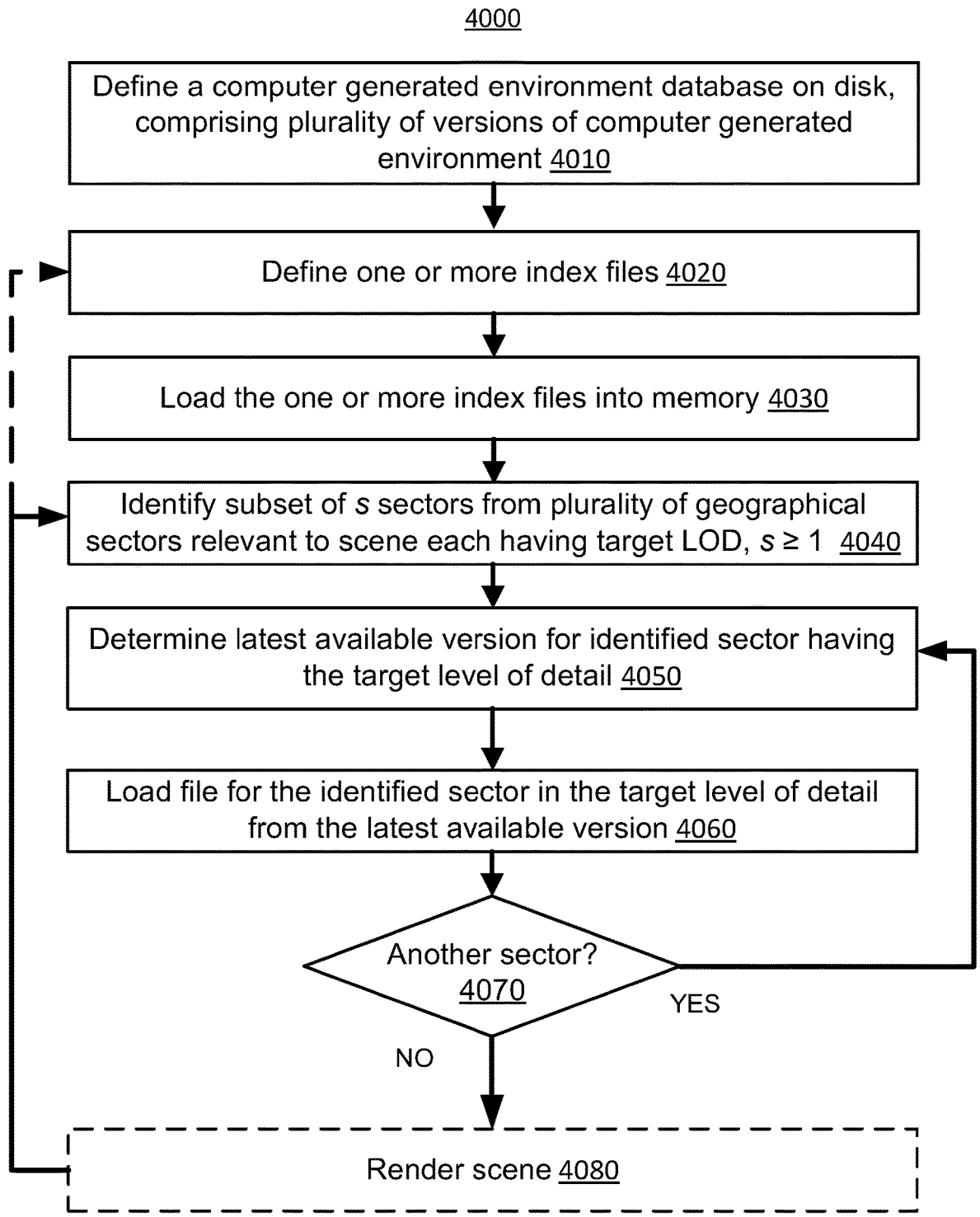
FIG. 4 shows an exemplary method for loading rendering data for a scene from a computer generated environment at an interactive computer simulation station in accordance with a first embodiment of the present invention.

FIG. 4 shows an exemplary method 4000 for loading rendering data for a scene from a computer generated environment at an interactive computer simulation station in accordance with a first embodiment of the present invention. The method 4000 may be performed, for example, by the processor module of the simulation stations. The method 4000 may be stored as computer-executable instructions in the memory module of the simulation stations that are executable by the processor module and configure the processor module to perform the functionality of method 4000.

The method 4000 comprises defining the computer generated environment database, on disk, comprising a plurality of versions of the computer generated environment (4010). The computer generated environment comprises a plurality of virtual geographical sectors, with each of the virtual geographic sectors being defined by 1 to f distinct files stored on the disk in the computer generated environment database. One or more virtual geographical sectors may be included in a scene of the computer generated environment to be displayed at the interactive computer simulation station to the user, and define, for example, geographical limits and/or boundaries of sectors within the scene. That is, the virtual geographical sectors may be representative of a granularity of the scene of the computer generated environment to be displayed to the user. The virtual geographical sectors may be defined by a simulation module for the object being simulated.

The rendering data for the scene of the computer generated environment may comprise a 3D mesh wrapped in 2D images. The 3D mesh may be a wireframe structure, for example. The 1 to f distinct files for each virtual geographical sector provide the rendering data for rendering the virtual geographical sector within the scene. The 1 to f distinct files are associated with distinct levels of detail for the virtual geographical sector.

Although the rendering data referred to herein is generally described in the context of files comprising the 2D images to be applied to the 3D mesh, a person skilled in the art would readily appreciate that the rendering data is not limited to such. For example, the rendering data may comprise auxiliary data used when rendering the scene at the simulation station. If the object being simulated is an airplane, for example, the rendering data may also comprise data for rendering a radar map that is specific to the type of airplane being simulated. Other examples of the rendering data would be understood by a person skilled in the art without departing from the scope of this disclosure.

One or more content files are defined for the data in the computer generated environment database (4020), each providing the list of files or metadata of their corresponding versions. For instance, the one or more content files may define available levels of details and the associated latest versions for the different files of each virtual geographical sector. This may be performed by listing a corresponding one of the distinct files stored in the computer generated environment database stored on disk.

During execution of an interactive computer simulation at the interactive computer simulation station, the one or more content files are loaded into memory for real-time access (4030). During the execution of the interactive computer simulation, a subset of s sectors that are relevant to the scene are identified from the plurality of virtual geographical sectors, each of the s sectors having a target level of detail, where $s \geq 1$ (4040). The method 4000 continues for each sector $s_i$ of the subset of s sectors identified as relevant to the scene. A latest available version is determined for the identified sector that has the target level of detail (4050). The file in the target level of detail from the latest available version is loaded from the disk storing the computer generated environment database (4060).

The target level of detail for each sector may be predefined based on a type of interactive computer simulation being performed. For example, if the interactive computer simulation being performed is simulating a drone flying across a desert that has very minimal distinctive features, the target level of detail may be less than an interactive computer simulation that simulates the drone flying across terrain that has specific landmarks of interest to the user simulating the drone. In some instances, the target level of detail may always be the highest level of detail available for the respective virtual geographical sector.

In further embodiments, the target level of detail for respective virtual geographical sectors may dynamically change based on relevance to the scene. For example, if the interactive computer simulation is simulating a drone approaching another simulated object, when the other simulated object appears far away in the scene the target level of detail for the virtual geographical sector associated with that object may be lower than the target level of detail for the virtual geographical sector associated with that object as the object appears closer in the scene.

In still further embodiments, the determination at (4050) may find that there is no available version for the sector having the target level of detail. The method 4000 may comprise determining a latest available version for the sector that has a level of detail less than the target level of detail, in descending order of the level of detail (not depicted in FIG. 4).

A determination is made if another sector has been identified as relevant to the scene (4070). If another sector has been identified (YES at 4070), the method returns to (4050) for determining a latest available version for the identified sector that has the target level of detail, and loading the file in the target level of detail from the latest available version (4060). The method 4000 repeats the procedure at (4050)-(4070) until there have been no more sectors identified as relevant to the scene for which the files still need to be loaded for (NO at 4070). Once all the files for each sector of the subset of identified sectors s have been loaded in the target level of detail from the latest available version, the scene may be rendered at a display of the interactive computer simulation station (4080). For example, the scene may be rendered using the GUI module at the simulation stations. Alternatively, each time a file of the target level of detail from the latest available version has been loaded from the disk, that file may be rendered prior to loading all files for all sectors relevant the scene.

After rendering the scene, the method returns to (4040) to continue to identify a subset of s sectors that are related to the scene, particularly because as the simulated object is controlled and manipulated in the computer generated environment the scene will continue to be updated. Additionally and/or alternatively, the method may return to defining the one or more content files (4020) if the content files are defined during run-time by the interactive computer simulation station.

In some embodiments, the computer generated environment database and/or content files may be defined prior to being provided to the simulation station, for example by the central data management system. The computer generated environment database and/or content files may also or alternatively be defined by the simulation station. As described above, in some instances the one or more content files may be defined by the interactive computer simulation station and loaded into the memory upon execution (e.g. start-up) of the computer generated environment. The one or more index may additionally or alternatively be continuously defined by the interactive computer simulation station and loaded into the memory during execution of the computer generated environment, for example in parallel with the interactive computer simulation. Accordingly, it is possible for the content files to capture any new files that may have been added to the computer generated environment database between executions of the interactive computer simulation and/or during the execution of the interactive computer simulation.

Figure 5:
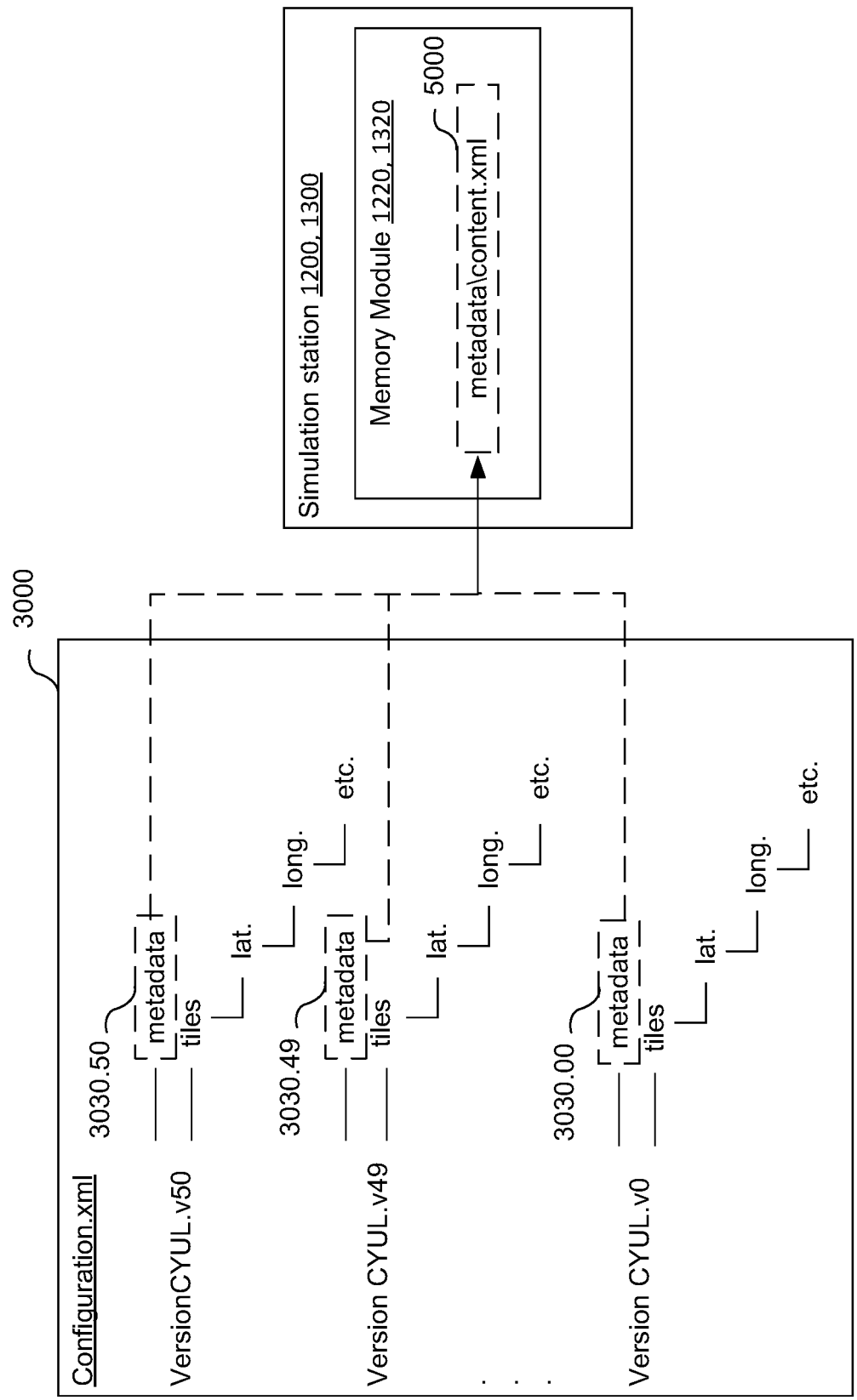
FIG. 5 shows a representation of defining a content file in accordance with the teachings of the present invention.

FIG. 5 shows a representation of defining a content file in accordance with the teachings of the present invention. As shown in FIG. 5, the content file 5000 named 'metadata\content.xml' is defined using the configuration file 3000 that has been defined within the computer generated environment database.

Metadata is created and associated with each version in the configuration file 3000. The metadata may list all files stored within each version of the computer generated environment, each file having a unique name per version. As depicted in FIG. 5, metadata 3030.50 is created for the files in 'VersionCYUL.v50', metadata 3030.49 is created for the files in 'VersionCYUL.v49', continuing for metadata 3030.00 created for the files in 'VersionCYUL.v00'. The metadata may be stored as a 'content.xml' file, and may be created off-line or in run-time at the time of installation, for example. If the 'content.xml' file does not exist at run-time, the file may be compiled in the background in parallel with execution of the interactive computer simulation.

The content file 5000 is created that defines available levels of detail and a latest version that the available levels of detail are contained in for each of the plurality of virtual geographical sectors contained in the computer generated environment database. Particularly, the definition is made by listing a corresponding one of the distinct files stored in the computer generated environment database that corresponds to the available level of detail in the latest version of the computer generated environment. Accordingly, the content file 5000 provides an indication of which files are available to be loaded for a particular level of detail and what version the file should be loaded from. The content file 5000 is loaded into the memory module 1220, 1320, of the simulation stations 1200, 1300, and thus during execution of the interactive computer simulation the existence and location of a file may be quickly determined by accessing the content file 5000, as has been described above.

The content file can also provide geographical area coverage per level of detail (LOD) and dataset type for each version. Therefore, runtime performance can be improved by skipping versions that do not have the requested data at a specified location, LOD and/or dataset type. Said differently, the content file may provide a potential existence of the file, therefore providing a 100% accuracy of the version that do not contain the requested file. For instance, the content file might relate to a square coverage area with a position, LOD and dataset type, but a portion of the square coverage area (e.g., in a very specific sub region) may be missing the specific dataset type. The present approach allows for predicting that missing information.

Figure 6:
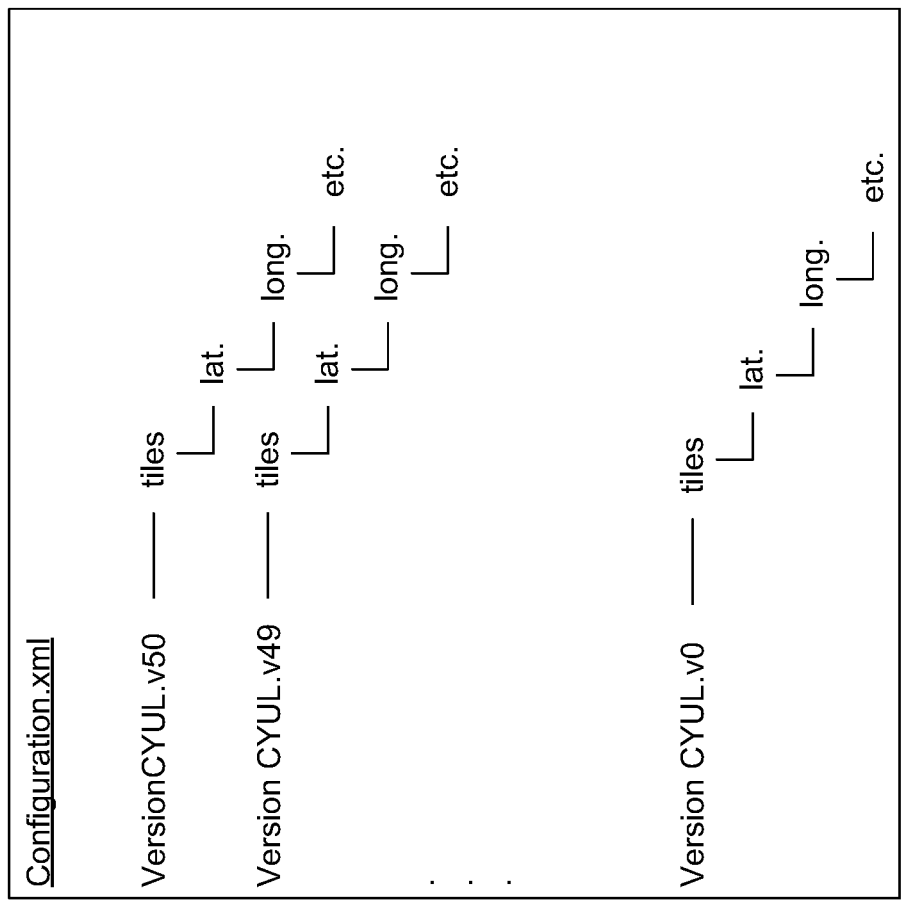
FIG. 6 shows a representation of defining a virtual content file in accordance with the teachings of the present invention.

FIG. 6 shows a representation of defining a virtual content file in accordance with the teachings of the present invention.

It would be appreciated by one of ordinary skill in the art that the system and components shown in FIGS. 1-6 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims. A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

The invention claimed is:

1. A method for loading rendering data for a scene from a computer-generated environment at an interactive computer simulation station, the method comprising:
   providing a computer-generated environment database, on a disk, comprising for each of a plurality of virtual geographical sectors 1 to f distinct files describing the corresponding virtual geographical sector with distinct levels of detail collectively and with one of the distinct levels of detail individually;
   defining a content file from the computer-generated environment database, the content file comprising metadata generated from the files describing each of the plurality of virtual geographical sectors, the metadata listing the distinct files describing the corresponding virtual geographical sectors of the computer-generated environment database and identifying for any given one of the virtual geographical sectors and any given one of the distinct levels of detail a corresponding one of the distinct files as providing a latest description of the given virtual geographical sector at the given level of detail;

during execution of an interactive computer simulation at the interactive computer simulation station, loading the content file into memory for real-time access;

during execution of the interactive computer simulation at the interactive computer simulation station, identifying a subset of s sectors that are relevant to the scene from the plurality of virtual geographical sectors; and for each sector $s_i$ of the s sectors:

accessing the metadata of the content file in the memory to locate in real time one of the distinct files providing a latest description of the sector $s_i$ at a target level of detail; and loading into the memory the located distinct file from the disk storing the computer-generated environment database, wherein the target level of detail for at least one sector $s_i$ of the s sectors is based on a type of the interactive computer simulation.

2. The method of claim 1, further comprising receiving commands from a user related to the interactive computer simulation, and wherein the identifying of the subset of s sectors that are relevant to the scene is based on the received commands.

3. The method of claim 1, further comprising:

rendering the scene at the interactive computer simulation station using a Graphical User Interface (GUI) module, wherein rendering the scene comprises rendering for each sector $s_i$ of the s sectors the located distinct file loaded into the memory.

4. The method of claim 1, further comprising: generating in response to a change that takes place in one of the plurality of virtual geographical sectors over the course of the simulation a distinct file describing the changed virtual geographical sector and reflecting the change; and upon the generation of the distinct file, updating the content file loaded into the memory.

5. The method of claim 1, further comprising determining the target level of detail for each sector $s_i$ of the s sectors based on the type of the interactive computer simulation.

6. The method of claim 1, wherein the target level of detail is a highest one of the distinct levels of detail available for the sector $s_i$.

7. The method of claim 1, wherein the target level of detail is predefined based on the interactive computer simulation.

8. The method of claim 1, further comprising determining the target level of detail for each sector $s_i$ of the s sectors based on relevance to the scene.

9. The method of claim 1, further comprising when none of the distinct files describes the sector $s_i$ at the target level of detail:

selecting one of the distinct files providing a latest description of the sector $s_i$ at a highest level of detail less than the target level of detail; and loading into the memory the selected file from the disk.

10. A system for loading rendering data for a scene from a computer-generated environment at an interactive computer simulation station, the system comprising:

a storage system, comprising:

a computer-generated environment database stored on a disk comprising for each of a plurality of virtual geographical sectors 1 to f distinct files describing the corresponding virtual geographical sector with distinct levels of detail collectively and with one of the distinct levels of detail individually; and a content file defined from the computer-generated environment database, the content file comprising metadata generated from the files describing each of the plurality of virtual geographical sectors, the metadata listing the distinct files describing the corresponding virtual geographical sectors of the computer-generated environment database and identifying for any given one of the virtual geographical sectors and any given one of the distinct levels of detail a corresponding one of the distinct files as providing a latest description of the given virtual geographical sector at the given level of detail; and the interactive computer simulation station, operably coupled with the computer storage system, comprising a processor and a memory for storing computer-executable instructions that when executed by the processor configure the processor during execution of an interactive computer simulation to:

load the content file into the memory for real-time access;

identify a subset of s sectors that are relevant to the scene from the plurality of virtual geographical sectors; and for each sector $s_i$ of the s sectors:

access the metadata of the content file in the memory, to locate in real time one of the distinct files as providing a latest description of the sector $s_i$ at a target level of detail; and for the sector $s_i$, load into the memory the located distinct file from the disk storing the computer-generated environment database, wherein the target level of detail for at least one sector $s_i$ of the s sectors is based on a type of the interactive computer simulation.

11. The system of claim 10, wherein the interactive computer simulation station further comprises an instrument module that is configured to receive commands from a user related to the interactive computer simulation, and wherein, when the processor executes the instructions, the processor is configured to identify the subset of s sectors that are relevant to the scene based on the commands.

12. The system of claim 10, wherein the interactive computer simulation station further comprises a Graphical User Interface (GUI) module configured to render the scene at the interactive computer simulation station by rendering for each sector $s_i$ of the s sectors the located distinct file loaded into the memory.

13. The system of claim 10, wherein the interactive computer simulation station further comprises a network interface module configured to receive the 1 to f files defining each of the plurality of virtual geographical sectors over a communications network, and wherein the plurality of virtual geographical sectors defined in the computer-generated environment database are associated with a subset of the computer-generated environment.

14. The system of claim 10, wherein, when the processor executes the instructions, the processor is further configured to generate in response to a change that takes place in one of the plurality of virtual geographical sectors over the course of the simulation a distinct file describing the changed virtual geographical sector and reflecting the change; and upon the generation of the distinct file, update the content file loaded into the memory.

15. The system of claim 10, wherein when the processor executes the instructions, the processor is further configured during execution of an interactive computer simulation to determine the target level of detail for each sector $s_i$ of the s sectors based on the type of the interactive computer simulation.

16. An interactive computer simulation station for loading rendering data for a scene from a computer-generated environment, the interactive computer simulation station comprising:
   a storage system, comprising:
      a computer-generated environment database stored on a disk comprising for each of a plurality of virtual geographical sectors 1 to f distinct files describing the corresponding virtual geographical sector with distinct levels of detail collectively and with one of the distinct levels of detail individually; and
      a content file defined from the computer-generated environment database, the content file comprising metadata generated from the files describing each of the plurality of virtual geographical sectors, the metadata listing the distinct files describing the corresponding virtual geographical sectors of the computer-generated environment database and identifying for any given one of the virtual geographical sectors and any given one of the distinct levels of detail a corresponding one of the distinct files as providing a latest description of the given virtual geographical sector at the given level of detail; and
   a memory for storing computer-executable instructions that when executed by a processor configure the processor during execution of an interactive computer simulation to:
      load the content file into the memory for real-time access;
      identify a subset of s sectors that are relevant to the scene from the plurality of virtual geographical sectors; and
      for each sector $s_i$ of the s sectors:
         access the metadata of the content file in the memory, to locate in real time one of the distinct files as providing a latest description of the sector $s_i$ at a target level of detail; and
         for the sector $s_i$, load into the memory the located distinct file from the disk storing the computer-generated environment database,
      wherein the target level of detail for at least one sector $s_i$ of the s sectors is based on a type of the interactive computer simulation.

17. The interactive computer simulation station of claim 16 further comprising an instrument module that is configured to receive commands from a user related to the interactive computer simulation and wherein, when the processor executes the instructions, the processor is configured to identify the subset of s sectors that are relevant to the scene based on the commands.

18. The interactive computer simulation station of claim 16 further comprising a Graphical User Interface (GUI) module configured to render the scene at the interactive computer simulation station by rendering for each sector $s_i$ of the s sectors the located distinct file loaded into the memory.

19. The interactive computer simulation station of claim 16 further comprising a network interface module configured to receive the 1 to f files defining each of the plurality of virtual geographical sectors over a communications network, and wherein the plurality of virtual geographical sectors defined in the computer-generated environment database are associated with a subset of the computer-generated environment.

* * * * *